United States Patent

[11] 3,600,887

| [72] | Inventors | Robert L. Gault<br>Garden City;<br>Thomas M. Sebestyen, Ann Arbor, both of, Mich. |
|---|---|---|
| [21] | Appl. No. | 856,527 |
| [22] | Filed | Sept. 8, 1969 |
| [45] | Patented | Aug. 24, 1971 |
| [73] | Assignee | Ford Motor Company<br>Dearborn, Mich. |

[54] ELECTRICAL STARTING AND OPERATING SYSTEM FOR GAS TURBINE ENGINE
8 Claims, 9 Drawing Figs.

[52] U.S. Cl............................................. 60/39.14,
60/39.28, 60/39.82, 431/79
[51] Int. Cl............................................. F02c 7/26
[50] Field of Search............................................. 60/39.14,
39.82; 431/79

[56] References Cited
UNITED STATES PATENTS

| 2,797,336 | 6/1957 | Loft | 431/79 X |
|---|---|---|---|
| 2,815,068 | 12/1957 | Forney | 431/79 X |
| 2,938,338 | 5/1960 | Creswick | 60/39.14 |
| 2,989,117 | 6/1961 | Graves | 431/79 UX |
| 3,151,452 | 10/1964 | Bunger | 60/39.14 |
| 3,310,937 | 3/1967 | Smith | 60/39.14 |
| 3,382,671 | 5/1968 | Ehni | 60/39.14 |

Primary Examiner—Clarence R. Gordon
Attorneys—John R. Faulkner and Glenn S. Arendsen ABSTRACT: A flame sensor deactivates the ignition system of a gas turbine engine as soon as a flame is detected in the combustion chamber during engine starting. The starter motor is disengaged automatically when gas generator speed approaches its idling speed. If a flameout occurs before the starter disengages, fuel flow to the engine is halted immediately and the starting cycle is aborted. The starting cycle also is aborted if the initial flame does not appear within a predetermined time. If a flameout occurs at idling speed, one relighting attempt of predetermined time duration is attempted. If a flameout or an overtemperature condition occurs during road load operation, the system immediately stops fuel flow to the engine but resumes fuel flow and attempts one relighting when gas generator speed gas generator speed has declined approximately to idling.

INVENTORS
ROBERT L. GAULT
THOMAS M. SEBESTYEN
BY
John R. Faulkner
Glenn S. Arendsen
ATTORNEYS

ELECTRICAL STARTING AND OPERATING SYSTEM FOR GAS TURBINE ENGINE

BACKGROUND OF THE INVENTION

Starting and operating systems for gas turbine engines traditionally have actuated the starter motor for a predetermined time regardless of whether a flame has been produced in the engine combustion chamber. Fuel accumulated in the engine during an unsuccessful starting attempt could create a serious hazard to internal engine components if ignition occurred near the end of the time period or upon an immediately succeeding starting attempt. Prior art systems also actuated the ignition system throughout the entire starting period which significantly reduced the effective life of the ignition components.

If a flameout occurred during idling, prior art systems made no relighting attempts, which necessitated waiting for the engine to coast to a complete stop before restarting.

In the event of a flameout during road load operation, some prior art systems made an immediate relighting attempt while others required the vehicle operator to wait for the engine to come to a complete stop before attempting to restart the engine.

SUMMARY OF THE INVENTION

This invention provides a control system for a gas turbine engine that deactivates the ignition system as soon as a flame appears in the combustion chamber of the engine. The system automatically aborts the starting attempt if a flameout occurs before the engine reaches idling speed, attempts a relight if a flameout occurs during idling, and attempts a relight at idling speed if a flameout occurs during road load operation. Only one relighting attempt of a predetermined duration is permitted in each instance, and the engine is shut down if relighting is unsuccessful.

The invention resulted from several discoveries concerning operating characteristics of gas turbine engines that include (1) actuation of the engine ignition system while a flame exists in the engine combustion chamber shortens unnecessarily the life of the ignition system components, (2) relighting attempts at speeds below and above idling seldom are successful and the highest probability of achieving a relight exists in a speed range within about 20 percent of normal idling speed, and (3) multiple relighting attempts and lengthy individual attempts create serious hazards to engine components and vehicle passengers. Circuitry in the system of this invention controls engine starting and operation in a manner that optimizes each of these characteristics and combines equipment providing the characteristics with other useful equipment.

In a gas turbine engine having a source of electrical energy, a starter motor, a fuel supply system and an igniter for igniting a mixture of fuel and air in the engine combustion chamber, the control system comprises a fuel control for controlling the supply of fuel to the engine and an igniter control for controlling the supply of ignition energy to the igniter. A manually actuated starter switch momentarily couples the energy source to the engine starter motor, and a starter control maintains the coupling until the starter control is deactivated by one of several possible signals. A flame sensor determines when a fuel-air mixture is burning in the engine combustion chamber. The flame sensor responds to the flame itself rather than to temperatures produced by the flame, and it disconnects the electrical energy source from the igniter as soon as a flame appears in the engine combustion chamber.

The flame sensor mechanism preferably is a light sensor that reduces its electrical impedance substantially to zero when the sensor observes a flame. Such a sensor can be connected in series with a flame-sensing relay that is actuated whenever a flame is present. A flame history relay is activated when a flame appears initially to perform several switching functions that permit only one relighting attempt after a flameout. Only one relighting attempt is permitted to prevent excessive fuel accumulation and consequent engine damage.

Switches responsive to the speed of the gas generator portion of the engine are included in the control circuit to perform switching functions at the lower and upper limits of an idling speed range conducive to successful relighting. Circuitry associated with these speed-responsive switches, is the flame sensor relay and the flame history relay abort the starting attempt if a flameout occurs during starting before the lower threshold of the idling speed range is reached, provides an immediate relighting attempt if a flameout occurs within the idling speed range, and provides a relighting attempt when engine speed has coasted into the idling speed range after a flameout at a higher engine speed.

The speed responsive switches can be pressure-sensitive devices connected to the outlet of the engine pump, which in most engines produces a pressure representative of gas generator speed. Alternatively, speed-sensing devices responding directly to the shaft speed of the gas generator can be used.

Two time delay relays also are included in the control circuit. One time delay relay measures the actuation period of the starter motor and aborts the starting cycle by disconnecting the starter and halting fuel flow if the delay period expires before a flame appears in the combustion chamber. The other time delay relay measures the time period during which a relighting can be attempted.

Information lights included in the control circuit are illuminated when no flame is present and when engine operation has been terminated because of excessive engine temperatures. The flame light conveniently is connected to the ignition system for the engine since the ignition system is actuated only when no flame is present.

DETAILED DESCRIPTION

Figure 1:
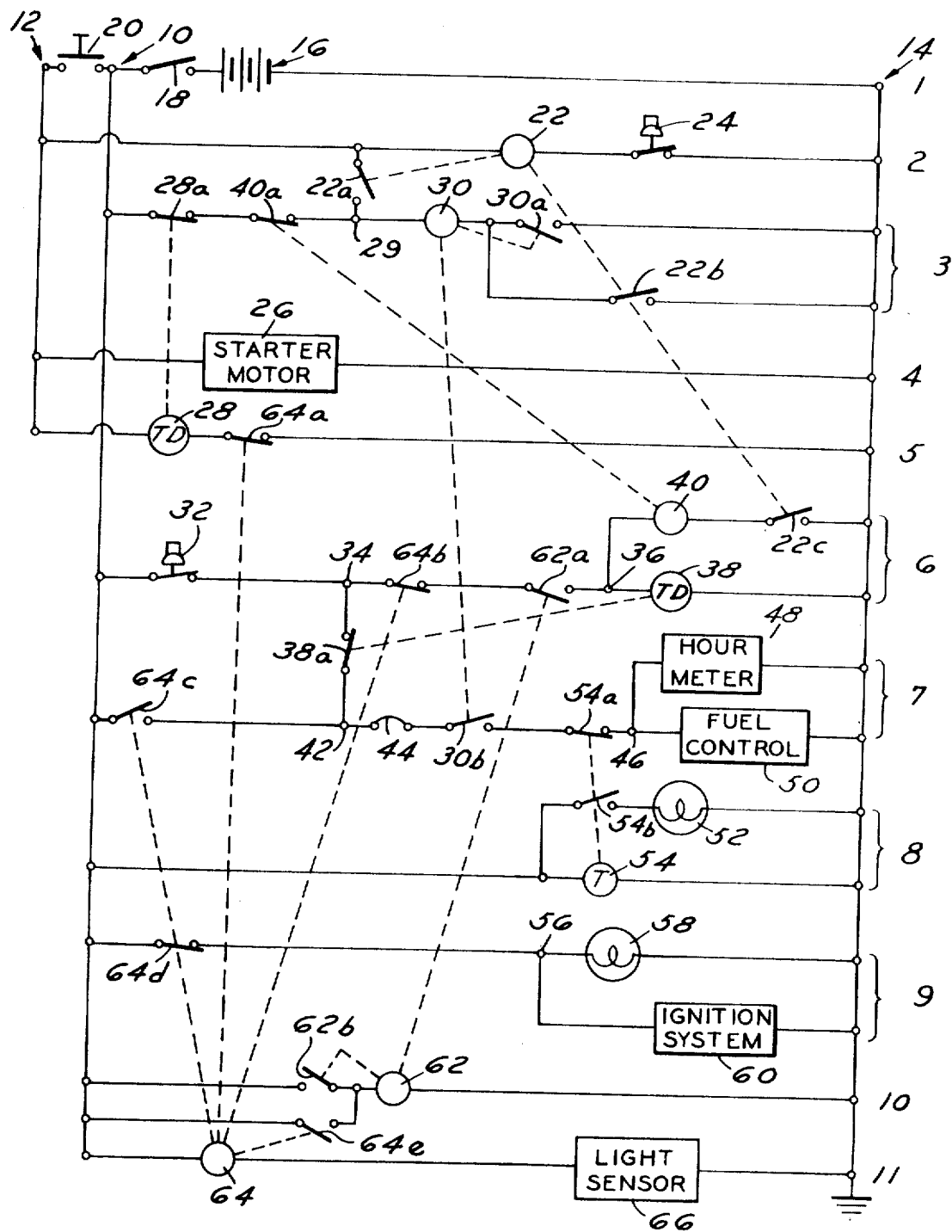
FIG. 1 is a circuit diagram of a control system of this invention showing the relays and switches in the unactuated conditions.

Referring to the drawings, the control system of this invention comprises a main bus lead 10, a starter bus lead 12 and a ground lead 14. Leads 10 and 12 are connected to ground lead 14 through a plurality of parallel circuits shown as numbered horizontal lines. The actuating coils of the relays in the system are shown as circles and the switches actuated by each relay are connected thereto by dashed lines.

Horizontal line 1 of the system comprises a conventional storage battery 16 having its positive terminal connected through a manual switch 18 to lead 10 and its negative terminal connected directly to lead 14. A spring-loaded starter switch 20 connects main lead 10 with starter lead 12.

In line 2, a starter control relay 22 in series with a speed-responsive switch 24 connect starter lead 12 to ground lead 14. Lines 4 and 5 also connect starter lead 12 to ground lead 14 with line 4 containing the starter motor 26 and line 5 containing a time delay relay 28 in series with a normally closed switch 64a.

Each of the other horizontal lines connects main lead 10 with ground lead 14. In line 3, two normally closed switches 28a and 40a in series with each other connect main lead 10 with an intermediate terminal 29. A normally open switch 22a connects starter lead 12 with terminal 29, and a fuel control relay 30 connects terminal 29 through a normally open switch 30a in parallel with a normally open switch 22b to ground lead 14. Switch 28a is opened by actuation of relay, which occurs after its time delay period has expired. Switches 22a and 22b are closed upon actuation of relay 22, and switch 30a is closed upon actuation of relay 30.

In line 6, a normally closed speed-responsive switch 32 connects main lead 10 with an intermediate terminal 34. A normally closed switch 64b in series with a normally open switch 62a connect terminal 34 with an intermediate terminal 36. A time delay relighting relay 38 connects terminal 36 with ground lead 14. In a parallel circuit with relight relay 38, an aborting relay 40 in series with a normally open switch 22c also connects terminal 36 with ground lead 14. Switch 22c is closed upon actuation of relay 22, and switch 40a in line 3 is opened by actuation of aborting relay 40.

Line 7 contains a normally open switch 64c connecting main lead 10 with an intermediate terminal 42. A normally closed switch 38a connects terminal 34 of line 6 with terminal 42 of line 7. Switch 38a is opened upon actuation of relight relay 38, which occurs when the time delay thereof expires. A fuse 44 in series with a normally open switch 30b and a normally closed switch 54a connects terminal 42 with an intermediate terminal 46. Terminal 46 is connected to ground lead 14 by an hour meter 48 in parallel with a fuel control valve solenoid 50. Actuation of relay 30 (line 3) closes switch 30b.

A temperature-sensing relay 54 connects main lead 10 with ground lead 14 in line 8. In parallel with relay 54 and a switch 54b and an engine temperature light 52. Actuation of relay 54 opens switch 54a and closes switch 54b when engine temperature exceeds a predetermined maximum.

Line 9 contains a normally closed switch 64d connecting main lead 10 to an intermediate terminal 56. Terminal 56 is connected to ground lead 14 by an information light 58 in parallel with an ignition system 60.

In line 10, a normally open switch 62b in parallel with a normally open switch 64e connects main lead 10 with a flame history relay 62. The other side of relay 62 is connected directly to ground lead 14. Line 11 contains a flame-sensing relay 64 in series with an ultraviolet light sensor 66 located in the engine combustion chamber. Light sensor 66 has a high internal resistance when no flame exists in the engine combustion chamber and this resistance drops substantially to zero to actuate relay 64 when the flame appears. Actuation of relay 64 opens switch 64a in line 5, opens switch 64b in line 6, closes switch 64c in line 7, opens switch 64d in line 9 and closes switch 64e in line 10. Actuation of relay 62 closes switch 62a in line 6 and also closes switch 62b in line 10.

Speed-responsive switch 24 preferably opens at gas generator speeds approximately 5–10 percent below normal idling speed. In a typical automotive gas turbine engine, idling speed is about 55 percent of maximum engine speed and switch 24 opens at about 47 percent of maximum engine speed. Speed-responsive switch 32 preferably opens about 5–10 percent above normal engine idling speed and in a typical gas turbine engine is set to open at approximately 60 percent of maximum engine speed.

Time delay relay 28 aborts a starting cycle if no flame appears within its time period. The relay typically has a delay period of about 4 seconds under the voltage applied thereto during actuation of the starter motor 26. Time delay relay 38 controls an engine-relighting attempt after a flameout and typically actuates about 2 seconds after the beginning of the delay period.

OPERATION

Figure 2:
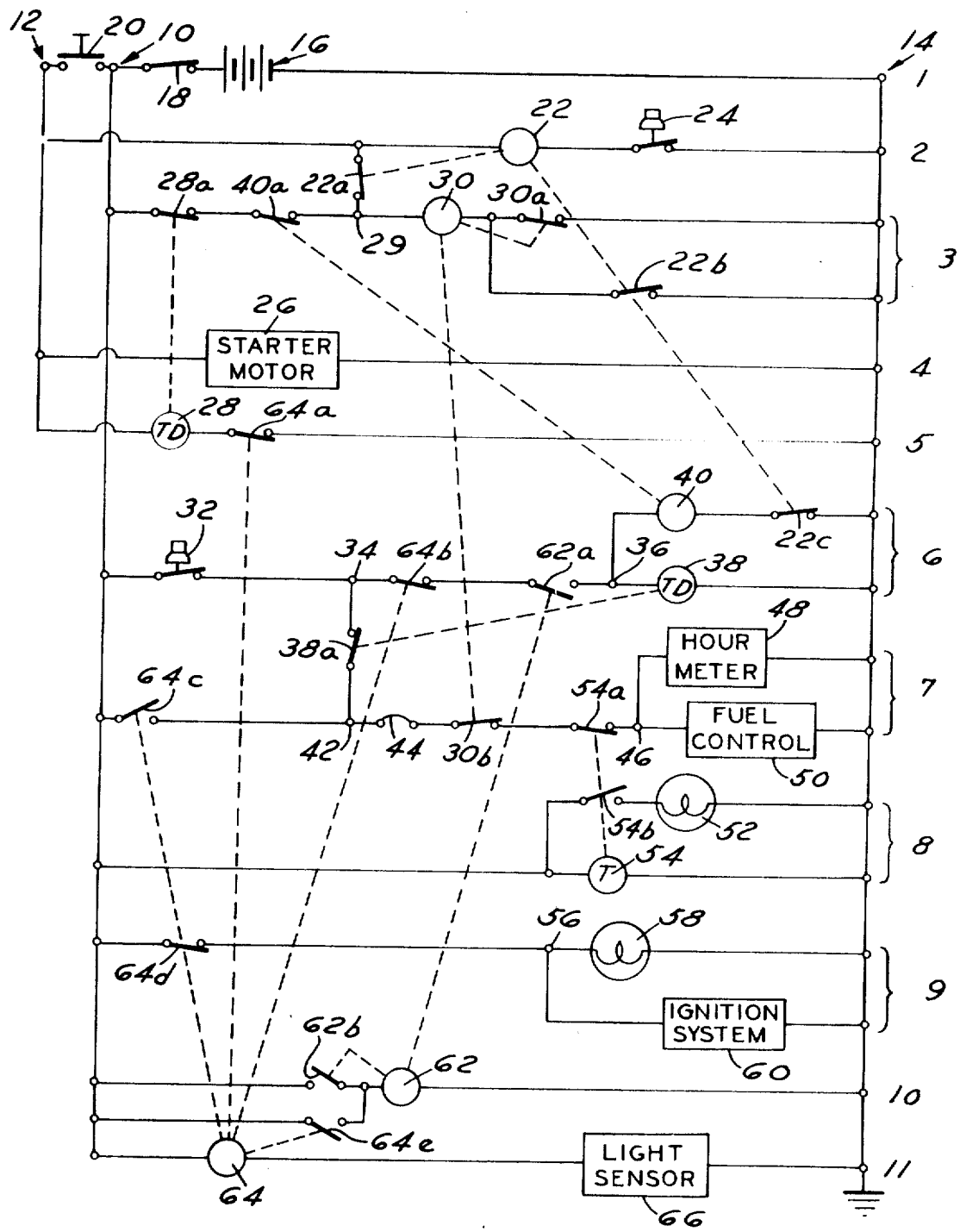
FIG. 2 shows the circuit during initial engine cranking before a flame has appeared in the engine combustion chamber. Fuel and ignition are being supplied and a time delay measuring the duration of the starter actuation is running; the time delay deactivates the starter and the fuel supply if no flame appears within a predetermined time.

To initiate a starting cycle, the vehicle operator closes switch 18 momentarily actuates the starter button connected to switch 20. Relay 22 is activated to close switches 22a, 22b, and 22c as shown in FIG. 2. Battery 16 is connected to starter lead 12 through switches 28a, 40a and 22a and starter lead 12 applies the battery voltage across starter motor 26 and time delay relay 28. By closing switch 22b, actuation of relay 22 also actuates fuel control relay 30 which in turn closes switches 30a and 30b Switch 30a maintains actuation of relay 30 and switch 30b activates fuel control solenoid 50 by the circuit made up of speed-responsive switch 32, switch 38a, switch 30b and switch 54a. The complete circuit during engine cranking thus attains the configuration shown in FIG. 2.

Figure 3:
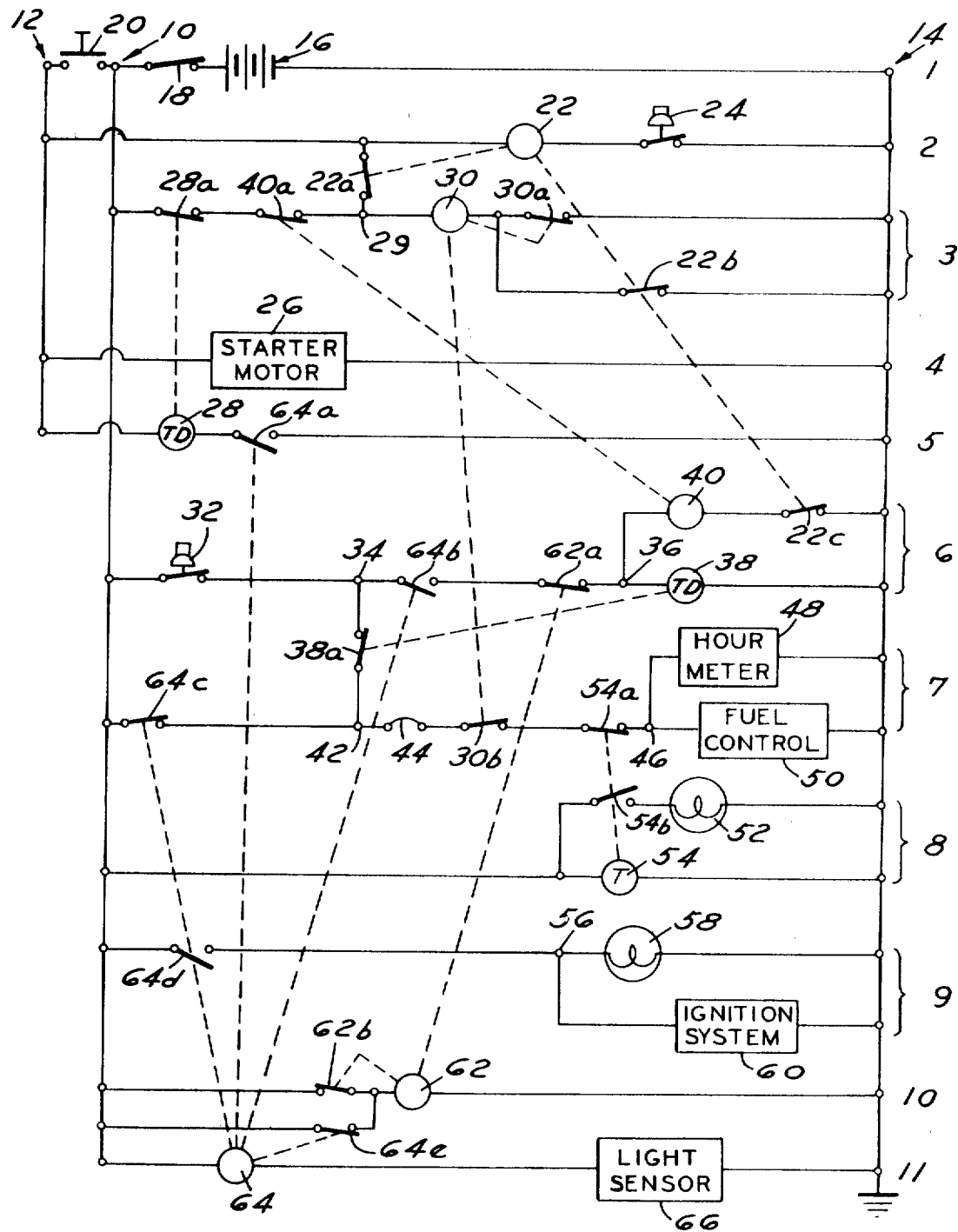
FIG. 3 shows the circuit during cranking after a flame has appeared. Both the ignition system and the time delay relay have been deactivated by the appearance of the flame.

If a flame appears in the engine combustion chamber before the delay period of relay 28 expires, the circuit attains the configuration shown in FIG. 3. The resistance of light sensor 66 drops substantially to zero to activate the relay 64 when the flame appears. Relay 64 opens switch 64a to deactivate time delay relay 28, opens switch 64b in line 6, closes switch 64c in line 7 to maintain actuation of solenoid 50, opens switch 64d in line 9 to deactivate the ignition system and extinguish light 58, and closes switch 64e in line 10 to actuate flame history relay 62. The flame history relay 62 in turn closes switch 62a in line 6 and also closes switch 62b in line 10. Switch 62b locks relay 62 across the source of energy to maintain actuation thereof. Closing switch 62a has no immediate effect on the circuit operation.

A proper starting cycle brings the speed of the gas generator up to engine idling speed under the combined assistance of the starter motor 26 and the normal combustion of the engine. As the engine passes the lower threshold of normal idling speed, speed-responsive switch 24 opens to deactivate relay 22. Relay 22 opens switches 22a, 22b and 22c and the circuit assumes the configuration shown in FIG. 4. Opening switch 22a disconnects starter lead 12 from battery 16, which disconnects starter motor 26. Opening switches 22b and 22c has no immediate effect.

Figure 4:
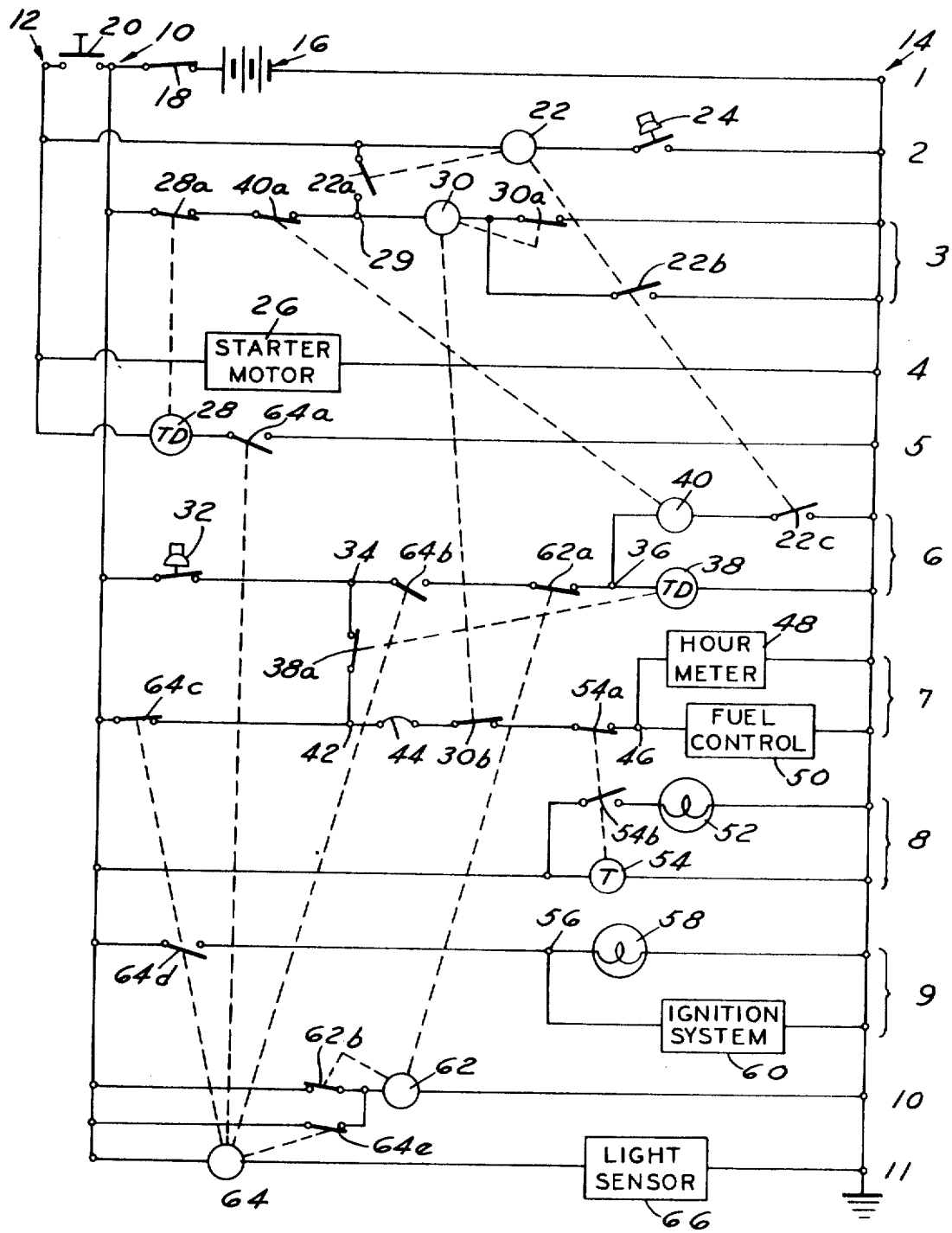
FIG. 4 shows the circuit at normal idling.

During normal idling, the control circuit maintains the configuration of FIG. 4. When gas generator speed exceeds about 60 percent of maximum engine speed to operate the engine at road load, speed responsive switch 32 opens. This has no immediate effect on engines operation, and the control circuit with this one change has the configuration shown in FIG. 4 for all phases of normal operation.

Turning back to FIG. 2, if no flame appears in the engine combustion chamber before the delay period of time delay relay 28 expires, relay 28 is actuated to open switch 28a. Opening switch 28a disconnects starter motor 26 from battery 16 and deactivates relays 22 and 30. Relay 30 opens switch 30b in line 7 to deactivate fuel control solenoid 50 which halts the supply of fuel to the engine. The starting attempt thus is aborted and the circuit returns to the inactive configuration shown in FIG. 1 with the exception that manual switch 18 remains closed. Relay 28 holds switch 28a open for a time period sufficient to permit the engine to coast to a complete stop. The vehicle operator then initiates another starting attempt by closing momentarily starter switch 20.

Figure 5:
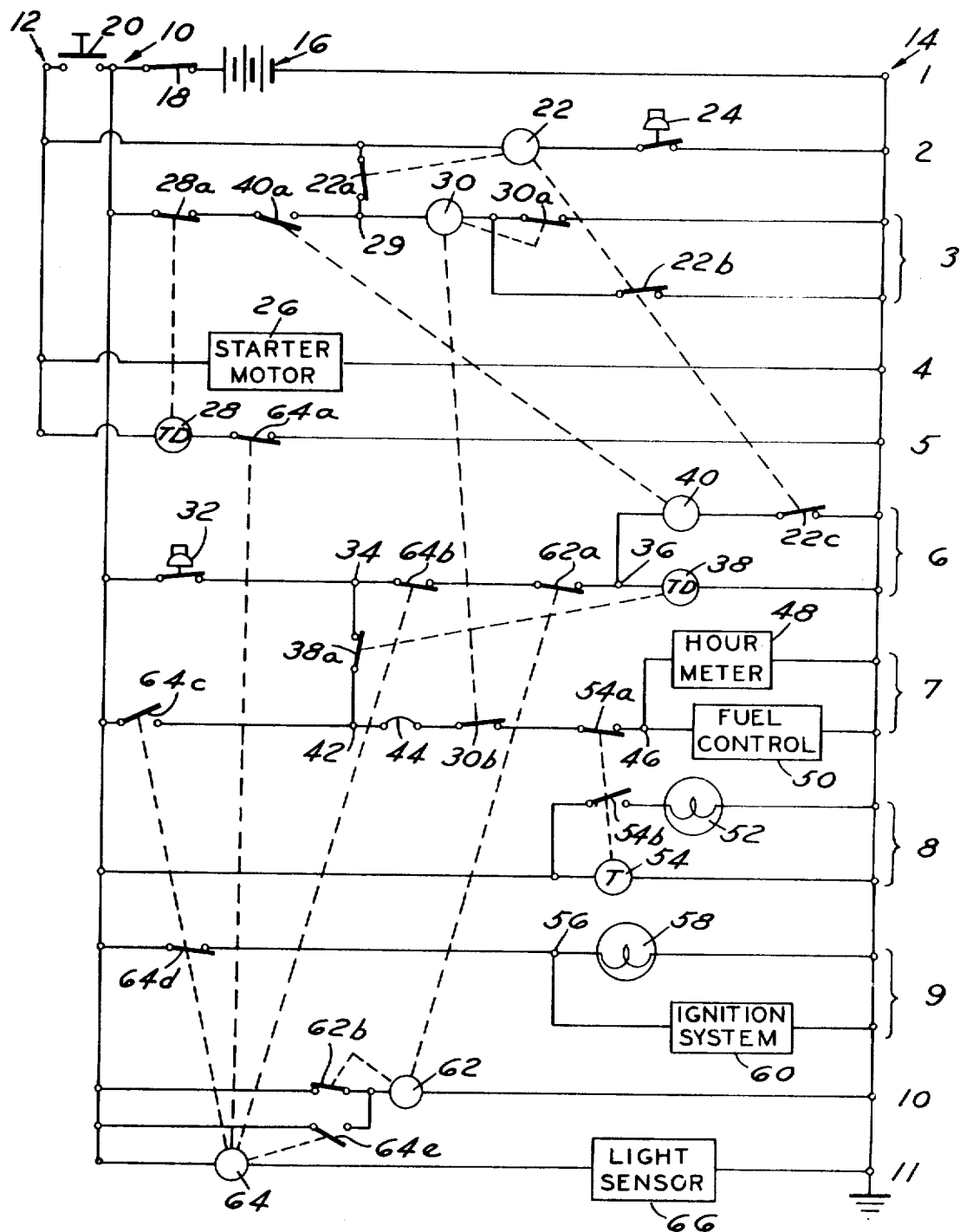
FIG. 5 shows the circuit at the instant of a flameout during cranking; the circuit has taken the initial step toward disconnecting the starter and stopping fuel flow.

As pointed out above, the control circuit assumes the configuration shown in FIG. 3 as soon as a flame appears in the combustion chamber during the starting cycle. If a flameout occurs before the gas generator speed has reached the threshold of the idling speed, the control circuit again aborts the starting cycle. FIG. 5 shows the circuit at the instant of the flameout. The flameout deactivates flame-sensing relay 64. Relay 64 closes switch 64d in line 9 which reactivates ignition system 60 and illuminates light 58 to inform the vehicle driver of the flameout. The relay also closes switch 64b in line 6; since flame history relay 62 has been activated, closed switch 62a applies battery voltage across relay 40 to activate aborting relay 40. Relay 40 opens switch 40a in line 3, which deactivates relays 22 and 30 and also disconnects starter motor 26 from battery 16. Deactivation of relay 30 opens switch 30b in line 7 to cut off the fuel flow to the engine. The starting attempt thus is aborted. Switch 18 must be opened to deactivate relay 40 before restarting can be attempted and relay 40 preferably contains a time delay sufficient to permit the engine to coast to a complete halt before its deactivation.

Figure 6:
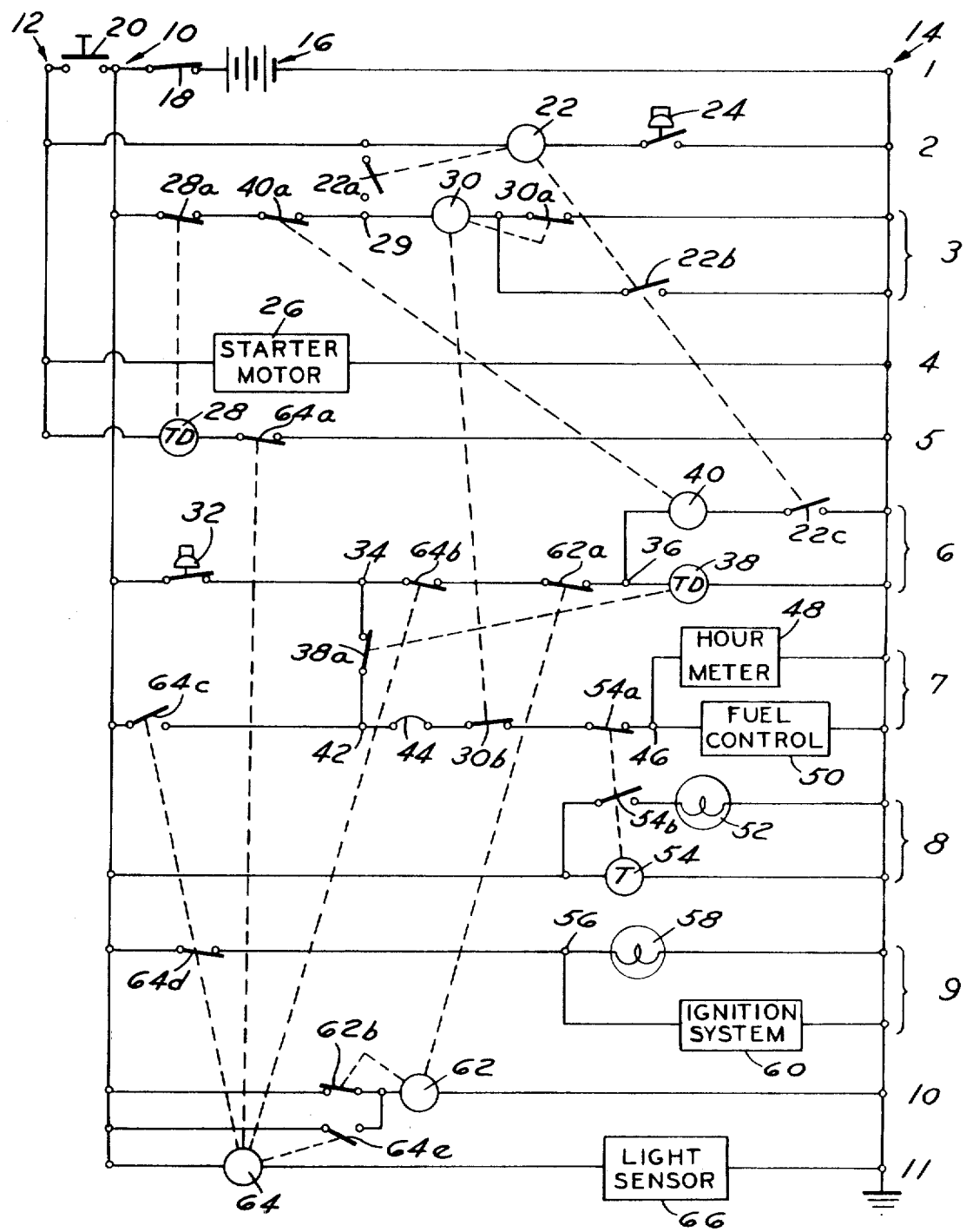
FIG. 6 shows the circuit while a relighting is being attempted within the idling speed range. Both fuel and ignition are being supplied to the engine but a running time delay will shut off fuel flow if relighting does not occur within a predetermined time period.

The control circuit immediately makes one attempt at relighting if a flameout occurs at engine idling. FIG. 4 shows the circuit configuration at idling and FIG. 6 shows the circuit configuration immediately after a flameout at idling. At flameout, relay 64 is deactivated to open or close its associated switches. Closed switch 64d activates ignition system 60 and also illuminates light 58. Since switch 62a has been closed, closing switch 64b begins the time delay period of relight relay 38. Although switch 64c is opened, fuel control 50 continues to be activated through switches 32, 38a, 30b and 54a.

If relighting is attained before the time delay period of relay 38 expires, activation of relay 64 disconnects the ignition system, reconnects the fuel control through switch 64c and disconnects relay 38 by opening switch 64b. If relighting is not achieved within the time delay period, relay 38 opens switch 38a which deactivates fuel control 50, and the engine coasts to a complete stop.

Figure 7:
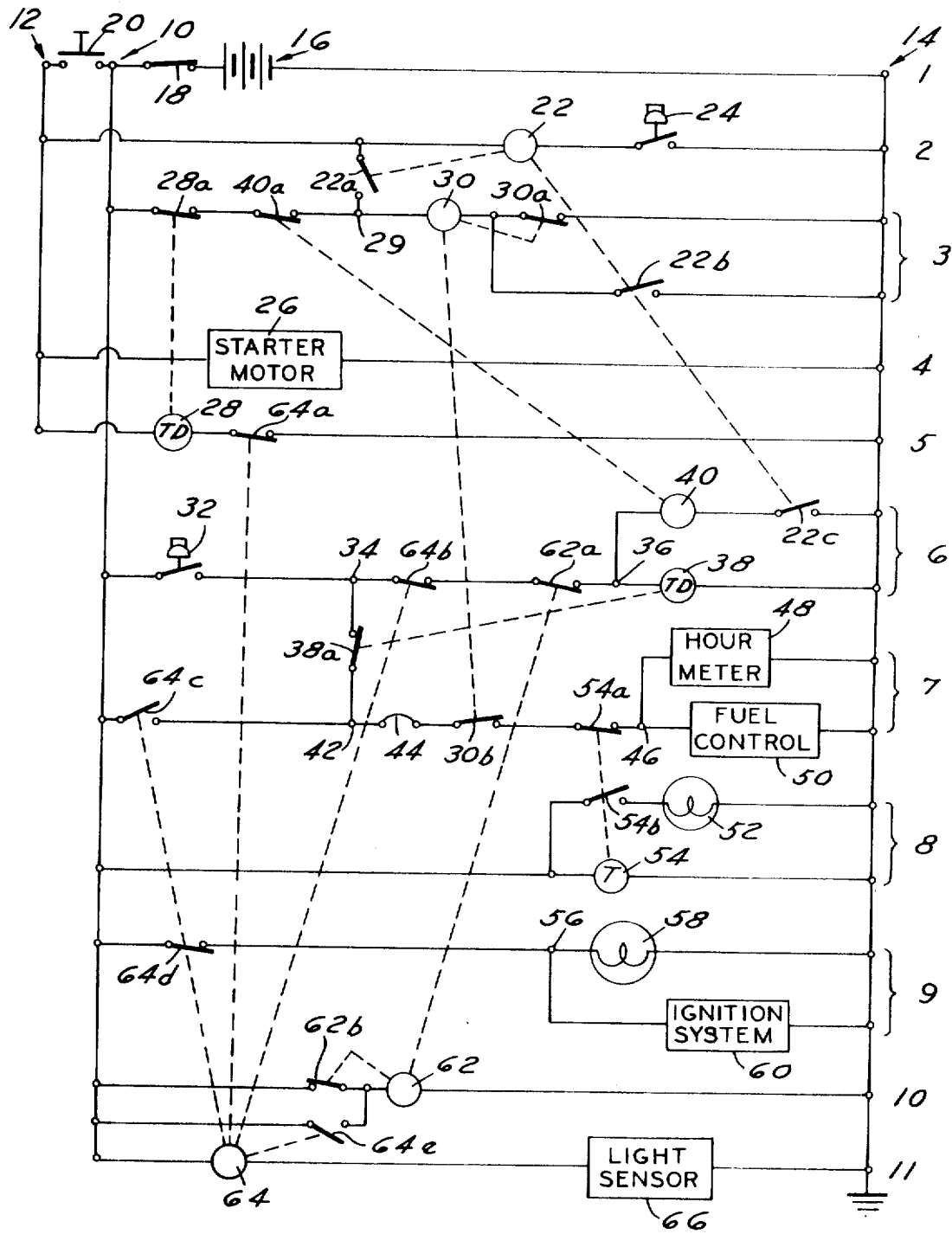
FIG. 7 shows the circuit after a flameout during road load operation; fuel flow has been halted and the gas generator is coasting toward the idling speed range at which the circuit assumes the configuration of FIG. 6 to attempt a relighting.

If a flameout occurs during road load operation, the control circuit attempts one relighting when the gas generator speed declines into the idling range. During road load operation the control assumes the configuration shown in FIG. 4 with the exception that speed-responsive switch 32 also is open. At flameout, relay 64 is deactivated to open or close its associated switches to attain the configuration of FIG. 7. With speed-responsive relay 32 open, fuel control 50 is deactivated immediately and time delay relay 38 is prevented from beginning its time delay period. When engine speed declines to about 60 percent of maximum speed, speed-responsive switch 32 closes, which begins fuel flow to the engine and also begins the delay period of relay 38. The circuit then has the configuration shown in FIG. 6. Successful relighting activates relay 64 to disconnect the ignition system, connect the fuel control into the circuit through switch 64c and deactivate time delay relay 38 by opening switch 64b. If relighting is not successful, relay 38 opens switch 38a to shut down the engine.

Figure 8:
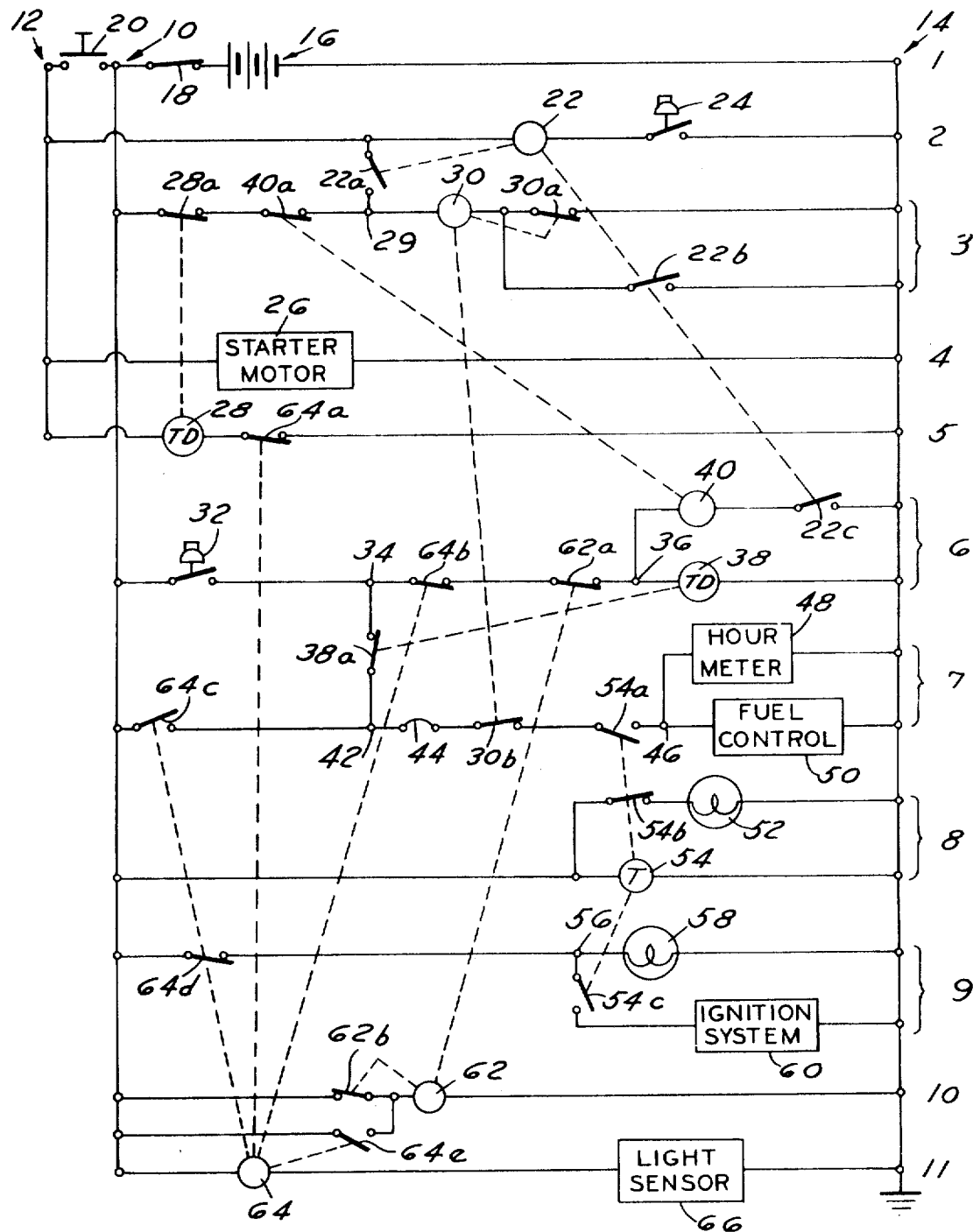
FIG. 8 shows the circuit during an overtemperature condition at road load speeds.

The control circuit also protects the engine against damage resulting from excessive engine temperatures. At normal operating temperatures, temperature sensitive relay 54 remains deactivated. If an excessive engine temperature occurs, relay 54 is activated to open switch 54a and close 54b. Open switch 54a immediately cuts off the supply of fuel to the engine, thereby extinguishing the flame, which in turn deactivates relay 64. Closing switch 54b illuminates overtemperature light 52 which informs the vehicle driver of the overtemperature condition (See FIG 8). An auxiliary switch 54c in line 9 between terminal 56 and ignition system 60 can be opened by actuation of relay 54 to cut off the ignition system if desired.

If the overtemperature condition is rectified by the time the gas generator speed has reduced to idling speed, relay 54 is deactivated and the engine automatically attempts a relight in accordance with the procedure described above with reference to FIG. 6. A continued overtemperature condition or an unsuccessful relighting attempt shuts down the engine completely.

Figure 9:
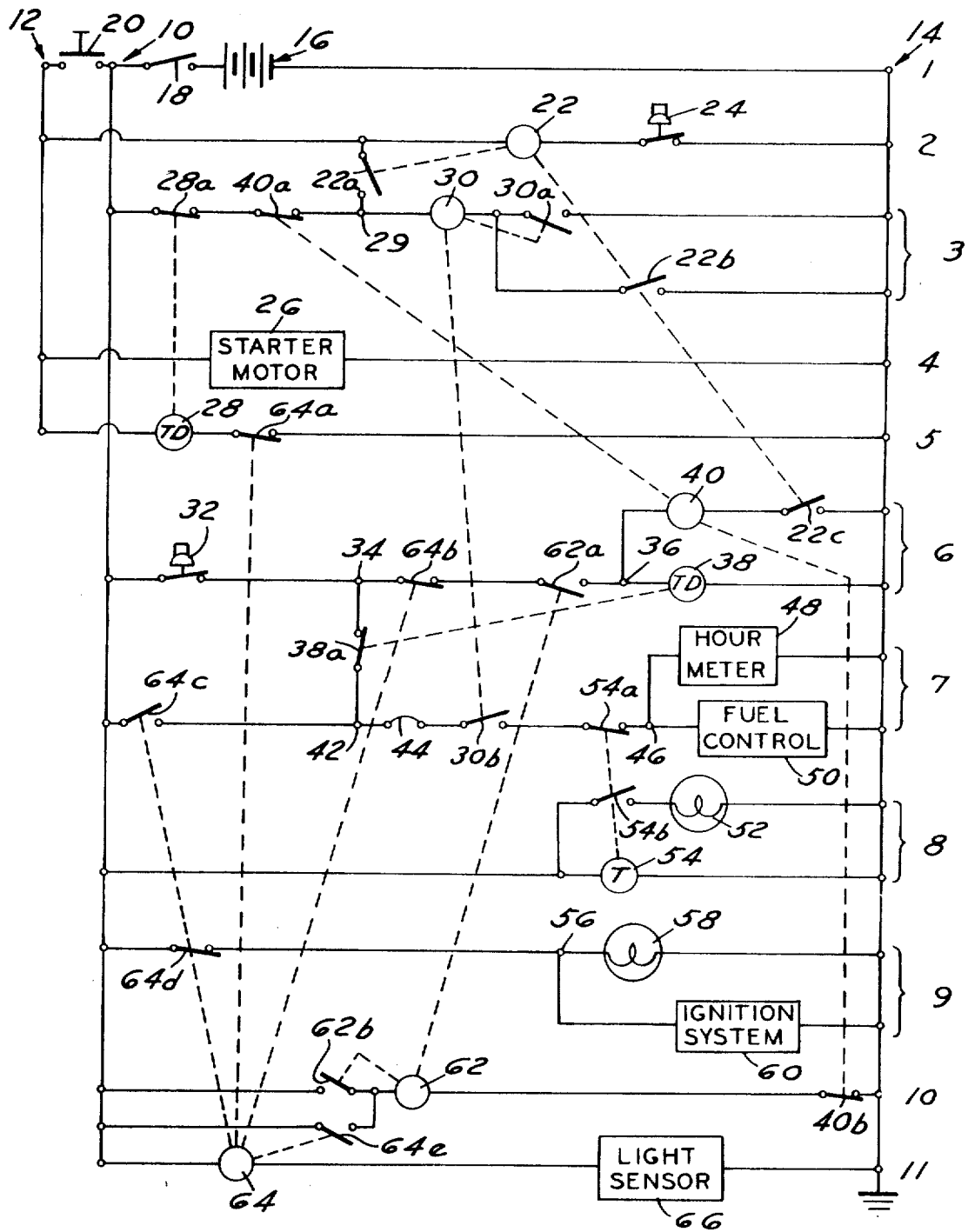
FIG. 9 shows an addition to the circuit that simplifies operator duties after a flameout during the starting cycle by resetting the circuit automatically.

Switch 38a can be located in line 3 without affecting its function. Switch 40a in fact can be connected to both relays 38 and 40 through a lost motion device so switch 40a performs the combined functions of switches 38a and 40a. Automatic resetting of the circuit after a flameout during the starting cycle can be attained by including a normally closed switch 40b in series with relay 62 in line 10 as shown in FIG. 9; actuation of relay 40 then opens switch 40b to deactivate relay 62. Relay 62 in turn opens switch 62a to deactivate relay 40 and also opens switch 62b to reset relay 62 itself. This arrangement eliminates the need for manually opening switch 18 before initiating another starting cycle. Switch 40a then preferably remains open for a time period even though relay 40 is deactivated to permit the engine to coast to a complete stop before another starting cycle can be initiated.

We claim:

1. A control system for a gas turbine engine having a source of electrical energy, a starter motor, a fuel supply system and an igniter for igniting a mixture of fuel and air in the engine, said control system comprising fuel control means for controlling the supply of fuel to the engine, igniter control means for controlling the supply of igniting means to any fuel-air mixture in the engine, a manual switch for coupling the electrical energy source to the starter motor, starter control means for maintaining the coupling of the electrical energy source to the starter motor after at least a momentary actuation of said manual switch, flame-sensing means for sensing when the fuel-air mixture is burning in the engine, said flame-sensing means disconnecting the electrical energy source from the igniter control means when a fuel-air mixture is burning in the engine, and circuit means for aborting a starting attempt when a flameout occurs at an engine speed below the idling speed range and for providing a single relighting attempt when a flameout occurs at an engine speed above the lower threshold of the idling speed range, said relighting attempt taking place within said idling speed range.

2. The control system of claim 1 in which the flame-sensing means comprises a flame-sensing relay that is actuated when a flame appears in the engine and the circuit means comprises a flame history relay coupled in parallel with said flame-sensing relay and a normally open switch in series with said flame history relay, said switch being closed by actuation of said flame-sensing relay, means for maintaining actuation of said flame history relay once the relay has been actuated, an aborting relay in parallel with said flame history relay and a normally open switch and a normally closed switch in series with said aborting relay, said normally open switch in series with said relay being closed by actuation of said flame history relay and said normally closed switch being opened by actuation of said flame-sensing relay, actuation of said aborting relay opening a normally closed switch in series with said fuel control means and said starter control means to abort a starting attempt when said flame history relay is actuated and said flame-sensing relay is deactuated.

3. The control system of claim 2 in which the circuit means comprises a relight relay in parallel with said aborting relay and in series with the normally closed switch and the normally open switch in series with said aborting relay, said relight relay including time delay means that activates the relight relay after the relight relay has been coupled to the electrical energy source for a predetermined time period, actuation of said relight relay opening a switch to cut off fuel supply to said engine.

4. The control system of claim 3 comprising means responsive to the rotational speed of the engine in series with said starter control means, said speed-responsive means opening to deactuate said starter control means and thereby decouple the starter motor from the electrical energy source when engine speed exceeds the lower threshold of said idling speed range.

5. The control system of claim 4 comprising a normally open switch in series with said aborting relay, said switch being closed when said starter control means is actuated, said switch being open at engine speeds above the lower threshold of said idling speed range to prevent actuation of said aborting relay.

6. The control system of claim 5 comprising means responsive to the speed of the engine in series with said relighting relay, said speed-responsive means opening when engine speed exceeds the upper threshold of said idling speed range.

7. The control system of claim 6 in which said lower and upper thresholds of said idling speed range are within 20 percent of normal engine idling speed.

8. The control system of claim 1 comprising means responsive to the rotational speed of the engine in series with said starter control means, said speed-responsive means opening to deactuate said starter control means and thereby decouple the starter motor from the electrical energy source when the engine speed exceeds the lower threshold of said idling speed range.